US012139390B2

(12) United States Patent
Griffioen et al.

(10) Patent No.: US 12,139,390 B2
(45) Date of Patent: Nov. 12, 2024

(54) CARTRIDGE FOR CONNECTING A BEVERAGE DISPENSING LINE AND OPENING A VALVE; ACTUATOR FOR OPERATING THE CARTRIDGE

(71) Applicant: Heineken Supply Chain B.V., Amsterdam (NL)

(72) Inventors: Edwin Johannes Cornelis Griffioen, Amsterdam (NL); Sergei Bogdanov, Novosibirsk (RU); Aleksandr Kudriavtsev, Novosibirsk (RU)

(73) Assignee: Heineken Supply Chain B.V., Amsterdam (NL)

( * ) Notice: Subject to any disclaimer, the term of this patent is extended or adjusted under 35 U.S.C. 154(b) by 112 days.

(21) Appl. No.: 17/904,013

(22) PCT Filed: Mar. 3, 2021

(86) PCT No.: PCT/NL2021/050141
§ 371 (c)(1),
(2) Date: Aug. 11, 2022

(87) PCT Pub. No.: WO2021/177821
PCT Pub. Date: Sep. 10, 2021

(65) Prior Publication Data

US 2023/0078570 A1 Mar. 16, 2023

(30) Foreign Application Priority Data

Mar. 3, 2020 (NL) ...................................... 2025040

(51) Int. Cl.
*B67D 1/00* (2006.01)
*B67D 1/04* (2006.01)
*B67D 1/14* (2006.01)

(52) U.S. Cl.
CPC ......... *B67D 1/1422* (2013.01); *B67D 1/0004* (2013.01); *B67D 1/0082* (2013.01);
(Continued)

(58) Field of Classification Search
CPC .. B67D 1/1422; B67D 1/0004; B67D 1/0082; B67D 1/04; B67D 2001/0094; B67D 2001/1488; B67D 2210/00049
See application file for complete search history.

(56) References Cited

U.S. PATENT DOCUMENTS 7,140,514 B2 * 11/2006 Van Der Klaauw ......................... B67D 1/1405 222/399
9,463,968 B2 * 10/2016 Schaefer ............. B67D 3/0058
(Continued)

FOREIGN PATENT DOCUMENTS

EP 1600421 A1 11/2005
WO 01/92142 A1 12/2001

OTHER PUBLICATIONS

International Search Report of PCT/NL2021/050141 dated May 10, 2021.

*Primary Examiner* — Frederick C Nicolas
(74) *Attorney, Agent, or Firm* — Banner & Witcoff, Ltd.

(57) ABSTRACT

An arrangement for filling containers like bottles with a beverage like beer in a retail environment includes a disposable dispensing line, from keg to outlet into the container. The dispensing line includes an actuable shut-off valve. The shut-off valve may be fitted in a cartridge, including a valve seat for receiving and accommodating a first part of the shut-off valve and an actuable connector arranged to engage with the shut-off valve to close or open the dispensing line. The cartridge may be fitted with a valve driving module, including an actuator driven by a driving unit and arranged to engage with the actuable connector for
(Continued)

operating the shut-off valve. The dispensing line may be opened or closed by squeezing the line in case of a flexible line, operating a reciprocating or rotating shut-off valve, other, or a combination thereof. The cartridge may be fitted in the filling arrangement.

20 Claims, 6 Drawing Sheets

(52) U.S. Cl.
CPC ........ *B67D 1/04* (2013.01); *B67D 2001/0094* (2013.01); *B67D 2001/1488* (2013.01); *B67D 2210/00049* (2013.01)

(56) References Cited

U.S. PATENT DOCUMENTS

| | | | | |
|---|---|---|---|---|
| 9,896,323 | B2 * | 2/2018 | Rasmussen | B67D 1/127 |
| 2014/0102570 | A1 | 4/2014 | Schaefer et al. | |
| 2017/0190560 | A1 | 7/2017 | Rasmussen | |
| 2023/0064119 | A1 * | 3/2023 | Griffioen | B67D 1/0888 |

* cited by examiner

110

CARTRIDGE FOR CONNECTING A BEVERAGE DISPENSING LINE AND OPENING A VALVE; ACTUATOR FOR OPERATING THE CARTRIDGE

TECHNICAL FIELD

Various aspect and embodiments thereof relate to the field of beverage container fillers.

BACKGROUND

Beverages, and beer in particular, are susceptible to growth of bacteria, yeast, mould, fungi, and/or other micro-organisms, and beer stone. To prevent these micro-organisms from affecting the quality of beverage dispensed by a device for filling beverage containers, any part of this device which may come into contact with the beverage has to be routinely and thoroughly cleaned. Cleaning may take place using hot water, steam, soda, disinfectants, hydrogen peroxide, or any other cleaning agent suitable for removing or disabling micro-organism.

SUMMARY

It is preferred to provide a beverage container filler, in particular a consumer operable retail beverage container filler for use in a retail environment, which requires less routinely and/or less thorough cleaning and/or which has less parts which require cleaning and/or of which the parts that require cleaning are more easy to clean.

In particular, a dispensing line, which provides a fluid connection between a supply container such as a keg and a beverage dispensing unit, comes into contact with the beverage and may thus require routine cleaning.

As an alternative to routinely cleaning the dispensing line, a disposable dispensing line may be used. A disposable dispensing line is known for example from WO01/92142. Such a disposable dispensing line does not require any cleaning action since it is discarded after use. The disposable dispensing line is used with a drink dispenser assembly. An outlet end of the disposable dispensing line is directly coupled to a dispensing head which is fixed to the counter of a bar. The dispensing head comprises a mechanism which is manually operable by a user for opening and closing a shut-off valve comprised by the disposable dispensing line.

A first aspect provides a cartridge for holding an outlet end of a disposable dispensing line, comprising a cartridge body, arranged to be connected to a beverage container filler, comprising a first dispensing line coupling element arranged to couple with the disposable dispensing line at a first position of the disposable dispensing line, an actuable element and in particular a machine actuable element, comprising a second dispensing line coupling element arranged to couple with the dispensing line at a second position of the dispensing line, wherein the actuable element is moveable relative to the cartridge body such that the first dispensing line coupling element is moveable relative to the second dispensing line coupling element between an open position and a closed position respectively corresponding to a dispensing state and a closed state of the disposable dispensing line.

The cartridge may be used in conjunction with a receptacle of a beverage dispensing unit, which receptacle is in such a case arranged for receiving at least part of the cartridge. The beverage dispensing unit may be a beverage dispensing unit comprised by a beverage container filler, in particular a consumer operable retail beverage container filler for use in a retail environment.

In examples, coupling the cartridge to the receptacle may be more convenient then coupling the beverage dispensing line directly to a beverage dispensing unit. Additionally or alternatively, coupling the beverage dispensing line to a cartridge prior to coupling the cartridge to the beverage dispensing unit gives a user more freedom in where to perform the replacement of a used beverage dispensing line with a new beverage dispensing line. This increase in freedom may be constituted because the beverage dispensing unit is often fixed in a housing at a fixed position, whereas the cartridge is a small handheld component which. The cartridge, when disconnected from the beverage dispensing unit, may be freely moved around since it is only connected to the disposable dispensing line, which preferably is a flexible and more preferably disposable dispensing line.

When the disposable dispensing line comprises a shut-off valve, one of the first position and the second position of the disposable dispensing line may correspond to a position on the shut-off valve or a particular part of the shut-off valve. The other of the first position and the second position may correspond to another part of the disposable dispensing line, and hence the shut-off valve may be operated by virtue of a movement of the actuable element relative to the cartridge body. In such embodiments, the open position and the closed position of the actuable element may respectively correspond to a dispensing state and a closed state of the shut-off valve.

The cartridge body may comprise a dispensing line through-hole arranged for allowing passage of at least the outlet end of the disposable dispensing line into the cartridge body. In embodiments of the cartridge body comprising the dispensing line through-hole, the outlet end of the disposable dispensing line may be inserted through the through-hole before coupling the dispensing line to the first and second dispensing line coupling elements.

When the cartridge is used with a counter pressure beverage dispenser, a gas tight seal may be required to prevent the required pressure for the counter pressure dispensing from leaking away through the dispensing line through-hole. Hence, the cartridge may comprise a through-hole sealing member provided in the dispensing line through-hole arranged to form a gas tight seal with the dispensing line for gas tightly sealing off the dispensing line through-hole, preferably when the dispensing line is provided in the dispensing line through-hole.

The dispensing line through-hole may be provided at an upstream end of the cartridge body, wherein upstream is related to a flow direction of beverage through the dispensing line. In particular, the direction from the beverage supply container, such as the keg, to the outlet end of the disposable dispensing line is considered a downstream direction.

Part of the actuable element may extend out of the cartridge body, in particular at the upstream end of the cartridge body. As such, an actuator for actuating the actuable element may be provided outside the cartridge body, and outside a pressurized area when using counter pressure filling.

When the first dispensing line coupling element faces the second dispensing line engagement, the first dispensing line coupling element may be moveable relative to the second dispensing line coupling element in a direction substantially perpendicular to a flow direction for beverage through the disposable dispensing line. As such, in these embodiments, a flow through area for beverage through the disposable dispensing line may be manipulated by squeezing the dispensing line between the first position and the second position.

For keeping or moving the actuable element into the closed position when no or not sufficient force is exerted on the actuable element, the cartridge may comprise a biasing element for biasing the actuable element in a particular position, preferably the closed position.

An actuator module may be used for actuating the actuable element. Since the actuable element is movable relative to the cartridge body, the actuator module may be arranged to move the actuable element relative to the cartridge body, and the cartridge body may comprise an actuator mount for mounting the actuator module to the cartridge body.

A second aspect provides a cartridge assembly for use in a beverage dispensing unit, comprising a cartridge according to the first aspect, and a disposable dispensing line, at a first position coupled with the first dispensing line coupling element and at a second position coupled with the second dispensing line coupling element.

The disposable dispensing line may comprise a shut-off valve, and one or the first position and the second position may corresponds to a position on the shut-off valve. As such, when moving the actuable element between the open position and the closed position, respectively the shut-off may be moved between a dispensing state and a closed state.

A distal end of the outlet end of the disposable dispensing line may extend out of the cartridge body. This may prevent beverage from being dispensed on the cartridge, which otherwise would cause a requirement of the cartridge being cleaned regularly to remove beverage from the cartridge.

A third aspect provides the actuator module for actuating an actuable element of a cartridge according to the first or second aspect, comprising an actuator housing connectable to the actuator mount of the cartridge, a force input for receiving an input force, a force output for exerting a force on the actuable element of the cartridge, and a force transmission module for coupling the force input to the force output.

When the force input comprises a pressurised gas inlet, the input force may be a pressure force from a pressurised gas provided to the pressurised gas inlet. The pressurised gas may be provided by the same pressurised gas source as the pressurised gas source providing pressurised gas to at least one of a supply beverage container and a beverage dispensing unit. As such, an additional energy source or power source may not be required. Alternatively, an alternative energy source may be used for providing the input force, such as an electric motor or a solenoid.

In a particular embodiment, wherein the force transmission module comprises a lever, wherein the lever is hingeable around a lever hinge point, the lever is at a first location arranged to receive a force from the force input, the lever is at a second location arranged to exert a force on the actuable element of the cartridge as the force output and the first location and the second location are at a distance from the lever hinge point.

By manipulating at least one of the first distance and the second distance, a mechanical advantage may be achieved. For example, the input force may be smaller than the output force or the input force may be larger than the output force.

For example, the second location is provided between the lever hinge point and the first location. As such, the force output location is provided between the force input location and the hinging point of the lever. As such, the general direction of the input force is the same as the general direction of the output force.

A fourth aspect provides a beverage dispensing unit for use in a beverage container filling arrangement, comprising a beverage dispensing unit housing, a beverage container holder arranged to receive and hold a beverage container, and a cartridge receptacle for receiving at least part of a cartridge according to the first aspect or a cartridge assembly according to the second aspect, wherein the cartridge receptacle comprises a through-hole extending towards the beverage container holder.

As such, the beverage line may extend through the cartridge into a dispensing area defined by the beverage dispensing unit housing and beverage may be dispensed into a container held by the beverage container holder by actuating the actuable element of the cartridge using the actuator module.

A dispensing controller may be arranged for controlling the input force on the force input of the actuator module. In particular embodiments, the dispensing controller may thus be arranged for controlling the supply of pressurised gas to the pressurised gas inlet of the actuator module.

The cartridge receptacle may comprise an actuator mount for connecting an actuator module according to the third aspect to. As such, the actuator module may find a fixed world in the beverage dispensing unit via the cartridge receptacle.

The aspects and embodiments described herein may in particular be applicable in a retail beverage container filling arrangement for use in a retail environment, which can be operated by a consumer. In examples, a retail beverage container is a bottle, such as a glass or plastic bottle with for example a screw cap or a crown cork, a can, a bag-in-container for use with home beverage dispensers, or any other type of beverage container usable and portable by a consumer.

The retail beverage container filling arrangement preferably is constructed such that it requires a minimum amount of maintenance and cleaning. Contrary to a factory with a professional bottle filling line, a supermarket as an example of a retail environment does not employ specialised maintenance engineers. Hence, a professional bottle filling line would not be suitable for use in such a supermarket due to the lack of specialised personnel for operating and maintaining the bottle filling line.

A consumer operable retail beverage container filling arrangement for use in a retail environment may comprise a housing, a beverage dispensing unit for dispensing a beverage, comprising a retail beverage container holder for receiving and holding a bottle, wherein the beverage dispensing unit is at least partially provided in the housing, a consumer interaction module for receiving a consumer input and generating a consumer control signal based on the received consumer input, and a dispensing controller arranged for receiving the consumer control signal and controlling the beverage dispensing unit in accordance with the consumer control signal.

Consumer operable may imply that the filling arrangement can be used by a consumer with little to no effort, requiring no special skills or technical knowledge. In examples, the consumer supplies an empty bottle as an example of a retail beverage container to the filling arrangement, which bottle is received by the retail beverage container holder. Next, by providing a consumer input to the consumer interaction module, the bottle can be automatically filled without requiring any further consumer input. Hence, the filling arrangement may be an automatic filling arrangement, wherein the dispensing controller controls the filling process after the consumer has supplied the empty bottle, for example up to the time at which the consumer removes the filled bottle from the filling arrangement.

Examples of a retail environment are those environments through which consumers navigate to buy products. For example, a supermarket, a shopping mall, a liquor store, a retail outlet of a craft brewery, and a grocery store may be considered as being retail environments.

The aspects and embodiments may alternatively or additionally be used in conjunction with a beverage dispensing unit comprising a beverage dispensing unit housing, a beverage container holder arranged to receive and hold a beverage container, a container sealing mechanism, comprising a sealing mechanism body, comprising a sealing surface arranged to form a gas tight seal with a part of a beverage container held in the beverage container to create a pressure chamber with the beverage container, a gas passage extending through the sealing mechanism body, and a dispensing line passage extending through the sealing mechanism body, wherein a downstream end of the dispensing line passage ends at a container side of the sealing mechanism body, and an actuator for moving at least one of the sealing surface and the beverage container holder, such that a distance between the sealing surface and the beverage container is reduced, wherein the downstream end of the dispensing line passage is provided at or near the sealing surface.

With this beverage dispenser unit, a pressure chamber can be created, formed by at least the beverage container and the sealing mechanism body. By virtue of the gas passage and the dispensing line passage, respectively a gas pressure can be built up in the pressure chamber, and beverage can be dispensed into the pressure chamber, in particular into the beverage container.

The dispensing line passage may be embodied as a through hole through the sealing mechanism, as a protrusion extending from the sealing mechanism with a hollow passage there through, or as a combination thereof. The sealing surface may define a sealing plane encircled or enclosed by the sealing surface. In embodiments, the dispensing line passage may extend through this sealing plane. When the dispensing line passage comprises a protrusion part, this protrusion part may be decoupled from the sealing mechanism body.

When the downstream end of the dispensing line passage is provided at or near the sealing surface, it may substantially be prevented that the dispensing line passage extends beyond a beverage level in the beverage container when the beverage container is fully filled up to the desired beverage level.

In known bottle filling arrangements using a filling tube which enters the beverage container before filling, the downstream end of the dispensing line passage thus ends inside the beverage container and is not provided at or near the sealing surface. During filling of the beverage container, the outside of the dispensing line passage comes into contact with the dispensed beverage. This contact causes the outside of the dispensing line passage to require frequent and thorough cleaning, to prevent growth of microorganisms on the outside of the dispensing line passage. Especially considering that the outside of the dispensing line passage comes into contact with beverage inside the beverage container, the cleanliness of this outside is very important.

A bottle, for example a glass or plastic bottle, is a typical example of a beverage container which may be filled with a beverage container filling arrangement. Such a bottle typically comprises a body and a neck part, wherein an opening of the bottle is provided in the neck part. The neck part may comprise one or more flanges, such as a support flange and/or a flange around which a cap can be provided. The neck part may alternatively or additionally comprise a thread to accommodate a screw cap. For creating the pressure chamber, a gas tight seal may be obtained on a side wall of the neck, on the top of the neck, on the body of the bottle, on a shoulder present between the neck and the body, on any other part of the bottle, or on a combination thereof In examples of the beverage dispensing unit, the downstream end of the dispensing line passage being provided at or near the sealing surface implies that the downstream end of the dispensing line passage does not extend into the neck of the beverage container, or does not extend into the body of the beverage container.

For a seal to be formed between the sealing mechanism body and a beverage container held in the beverage container holder, at least one of the sealing mechanism body and the beverage container holder has to be moved towards the other, or both are moved towards each other. To hold the seal, and to prevent the pressure inside the pressure chamber formed by the beverage container and the sealing mechanism body from breaking the seal, a force coupling has to be present between the beverage container holder holding the beverage container and the beverage container holder via the actuator.

The actuator may be connected to the beverage dispensing unit housing. This connection may be direct or via one or more other components, and the connection may be substantially rigid, or may comprise one or more biasing, spring, and/or damping elements.

In particular embodiments, the actuator comprises one or more connection elements arranged to be connected to a housing of the beverage container filling arrangement.

In another embodiment, to provide the force coupling between the beverage container holder holding the beverage container and the beverage container holder via the actuator, the actuator may comprise a connection element arranged to be connected to a housing of the beverage container filling arrangement. As such, the force required for making and maintaining the seal may have a force path through the housing of the beverage container filling arrangement.

When the actuator is arranged to be operable by virtue of a pressurized gas, the actuator may comprise a pressurised gas inlet for receiving a pressurized gas flow, and a piston provided in fluid connection with the pressurized gas inlet, wherein the piston is arranged for moving at least one of the sealing surface and the beverage container holder.

The pressurised gas may originate from the same pressurised gas source as the source used for pressurising the pressure chamber formed by the beverage container and the sealing mechanism body. As such, an additional energy source such an electric motor or a hydraulic/pneumatic pump may not be required for operating the actuator. However, embodiments are envisioned wherein the actuator is operable by virtue of an electric motor, either directly or indirectly.

Furthermore, when the same pressurised gas source is used for pressurising the pressure chamber formed by the beverage container and the sealing mechanism body and for pressing the sealing surface and the beverage container together, an equilibrium may be obtained which prevents the pressure inside the pressure chamber from pressing the sealing surface away from the beverage container.

In particular embodiments, the actuator is arranged to move the sealing surface towards the beverage container holder. Hence, in particular embodiments, the beverage container holder is not moveable. In use, the actuator movement may be a substantially downward movement, in a direction opposite to the gravity vector. The movement of the actuator may be a translation, a rotation, or a combination thereof.

The beverage dispensing unit may comprise a biasing element arranged to bias the sealing surface away from the beverage container holder. As such, a force is required exceeding the biasing force for pressing the sealing surface towards a beverage container held by the beverage container holder. If this force drops away for some reason, the biasing element presses the sealing surface away from the beverage container holder as a safety precaution.

In embodiments, the sealing mechanism body may be mounted between the actuator and the container holder. The actuator may be connected to the container holder, and the sealing mechanism body may be moved between the actuator and the container holder towards the container holder.

The beverage dispensing unit may further comprise a gas conduit, at a first end connected to the gas passage of the container sealing mechanism, and of which a second end is exposed to ambient pressure, wherein the beverage dispensing unit further comprises a gas conduit control valve arranged to control a flow through area for gas through the gas conduit between the first end and the second end. Alternatively, the gas conduit control valve may be arranged in or directly connected to the gas passage of the container sealing mechanism.

During the counter pressure filling process, the volume available in the pressure chamber for the pressurised gas decreases due to the beverage being dispensed into the pressure chamber. Furthermore, in order to dispense beverage into the pressure chamber, the pressure on the beverage in the dispensing line has to exceed or at least be equal to the pressure inside the pressure chamber. To prevent the pressure in the pressure chamber from exceeding a threshold beyond which beverage is not dispensed anymore, part of the volume of gas in the pressure chamber has to be drained to lower the pressure inside the pressure chamber.

To controllably drain gas from the pressure chamber, the gas conduit control valve may be used. In examples, the gas conduit control valve may be an in-line valve provided inside the gas conduit between the first end and the second end thereof. In other examples, the gas conduit control valve may be provided around the gas conduit between the first end and the second end thereof, wherein the gas conduit control valve is arranged to clamp, squeeze and/or otherwise engage the gas conduit to control the flow of gas through the gas conduit, for example by manipulating the flow through area through the gas conduit. Hence, at least part of a gas conduit may be flexible, resilient, and/or elastic.

The control of the gas conduit control valve may provide a constant or substantially gradually changing flow through area for gas through the gas conduit between the first end and the second end. Alternatively, the control of the gas conduit control valve may provide a substantially abrupt, discrete and/or stepwise changing flow through area for gas through the gas conduit between the first end and the second end. A pressure sensor may be provide for detecting a pressure inside the pressure chamber, and a pressure sensor signal generated by the pressure sensor may be used for controlling the gas conduit control valve.

In accidental situations, while draining gas from the pressure chamber, some beverage may also be sucked into the drain gas conduit. To prevent this beverage from spoiling on parts of the filling arrangement, which parts would then require cleaning, the beverage dispensing unit may further comprise a drain container, and wherein a second end of the gas conduit ends is in fluid connection with the drain container.

Embodiments of the sealing mechanism body are envisioned comprising multiple gas passages, in particular an input gas passage and an output gas passage. The input gas passage may be connectable to a pressurised gas source, and the output gas passage used for draining gas as explained in the paragraphs above.

In particular embodiments, the beverage dispensing unit may be arranged to be used in combination with a disposable dispensing line. To accommodate the disposable dispensing line, and in particular a dispensing end thereof, the dispensing line passage may be arranged for receiving a outlet end of a disposable dispensing line. In such embodiments, a gas tight sealing member may be provide to prevent gas leakage out of the pressure chamber through the dispensing line passage.

As a further option, the dispensing line passage may comprise a receptacle for receiving a cartridge for holding an outlet end of a disposable dispensing line. Using a cartridge may ease obtaining a gas tight seal of the dispensing line passage, and/or may ease the connecting a disposable dispensing line to the beverage dispensing unit.

BRIEF DESCRIPTION OF THE FIGURES

In the figures.

DETAILED DESCRIPTION OF THE FIGURES

Figure 1:
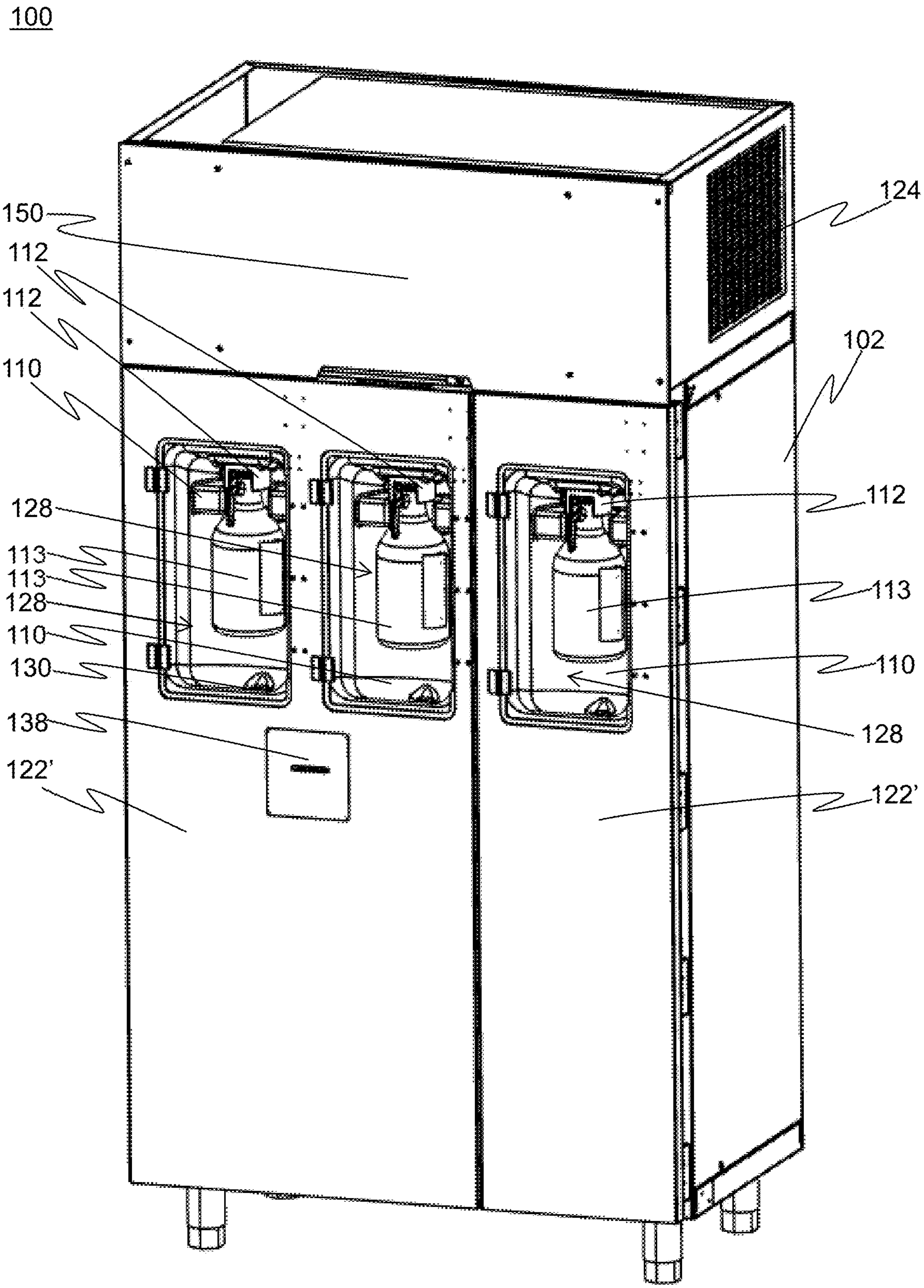
FIG. 1 shows an embodiment of a consumer operable retail beverage container filling arrangement.

FIG. 1 shows an embodiment of a consumer operable retail beverage container filling arrangement 100 for use in a retail environment. The filling arrangement 100 comprises a housing 102. The housing 102 comprises a left housing door 122' and a right housing door 122". The left housing door 122' and a right housing door 122" together close off a storage area of the housing 102. The left housing door 122' and right housing door 122" are hingedly attached to the housing 102, such that they can both open outwardly to open a storage area access opening.

The left housing door 122' is provided with two beverage dispensing units 110, and the right housing door 122" is provided with a single beverage dispensing unit 110. When opening a housing door, any beverage dispensing unit 110 provided in the respective housing door is moved away such that it does not block the storage area access opening.

The filling arrangement 100 comprises, as an option, a display 150 for displaying information to a consumer using the filling arrangement 100. As a further option, the filling arrangement 100 comprises a label printer 138, which in this particular embodiment is provided in the left housing door 122'. As an even further option, the housing comprises a cooling unit, of which a radiator 124 is visible in FIG. 1. The radiator 124 may be used as a heat exchanger with the surroundings of the filling arrangement 100 for cooling the storage area of the housing 102.

As a mere example, each beverage dispensing units 110 comprises a growler holder 112 as a beverage container holder, with in each growler holder 112 a growler 113. The growlers 113 are suspended from the growler holders 112 in a dispensing compartment 128. Each of the dispensing units 110 is provided with a door for closing of the dispensing compartments. The doors are not visible in FIG. 1, as the doors are transparent. At the left of each of the dispensing compartments, FIG. 1 shows hinges for connecting the doors to the applicable housing doors 122. Embodiments of the filling arrangement 100 are envisioned wherein one or more of the dispensing compartments is provided with one or more dispensing compartment doors.

In embodiments, the display 150 is a touch screen and forms part of a consumer interaction module. A touch input provided by the consumer to the touch screen may be used to generate a consumer control signal. Additionally or alternatively, one or more sensors may be provided for detecting the presence of a growler 113 in a growler holder 112, for detecting whether a door such as a housing door 122 and/or a dispensing compartment doors is in an opened or closed state, and/or detecting any other type of consumer interaction with the filling arrangement 100.

For example, when the consumer provides a growler 113 to the growler holder 112, this may be regarded as a consumer interaction with the device and thus as a consumer input, and may hence be used to at least partially generate the consumer control signal. When the consumer opens or closes a dispensing compartment door, this may also be regarded as a consumer interaction with the device and thus as a consumer input, and may hence be used to at least partially generate the consumer control signal.

Thus, in general, the consumer interaction module may comprise any sensor which may detect a consumer interaction with the filling arrangement 100 and any consumer interaction with the filling arrangement 100 may be considered to be a consumer input.

Preferably, to make the filling arrangement 100 particularly consumer operable, the consumer does not need to operate any valves, handles, or any other controls to operate the filling arrangement 100. Hence, as a preference, the consumer only needs to provide an empty beverage container to the retail beverage container holder. The rest of the filling process will then be governed by the dispensing controller.

In a particular example, the housing doors 122 of the filling arrangement 100 are closed. Next, the consumer opens one of the dispensing compartment doors and places a growler 113 into the growler holder 112 associated with the same beverage dispensing unit 110 as the opened dispensing compartment door. After placing the growler 113, the dispensing compartment door is closed, either by the consumer of by the filling arrangement 100 itself, for example using a biasing element forcing the dispensing compartment door in a closed state. The dispensing controller may receive a consumer control signal based on any of these consumer interactions with the filling arrangement 100, and proceed with filling the growler 113 accordingly.

Figure 2:
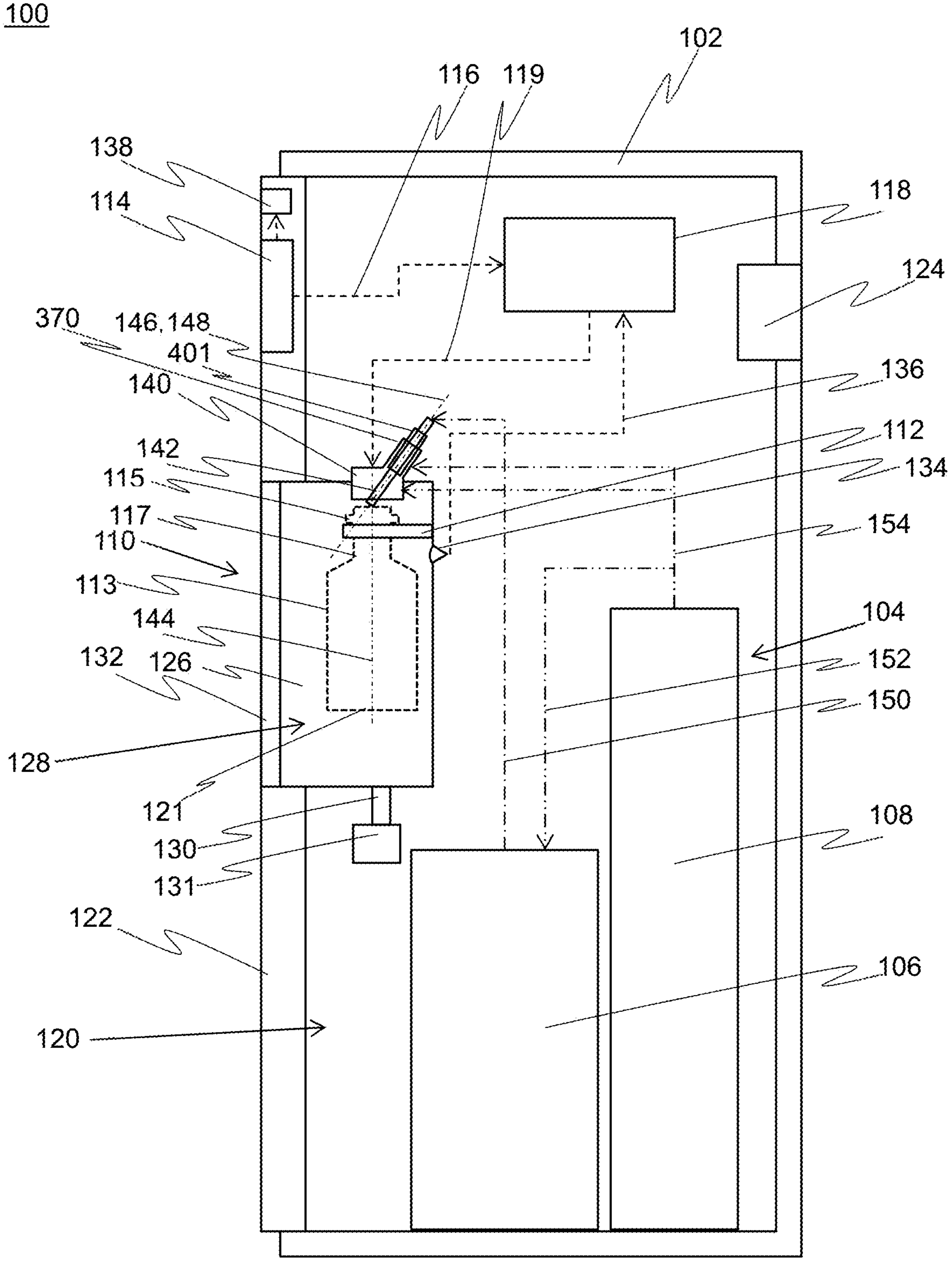
FIG. 2 shows a schematic cross-section of an embodiment of a filling arrangement.

FIG. 2 shows a schematic cross-section of an embodiment of a filling arrangement 100, in particular a consumer operable retail beverage container filling arrangement for use in a retail environment. The filling arrangement 100 comprises a housing 102, in which for this particular embodiment and as an option for other embodiments of the filling arrangement 100, substantially defines the volume occupied by all components of the filling arrangement 100, except for a power cord which is to be plugged into a power outlet of a retail environment.

In these preferred embodiments, the filling arrangement 100 can be placed anywhere in the retail environment as long as sufficient electrical power can be provided to the filling arrangement 100. The housing 102 may be placed on rollers or wheels for increased movability.

As depicted in FIG. 2, the housing 102 comprises a storage area 104. In the storage area 104 a keg 106 as a supply beverage container and a CO2 cylinder 108 as a pressurised gas source are stored. A dispensing line 150 is provided between the keg 106 and the beverage dispensing unit 110. A gas conduit 152 provides a fluid connection between the CO2 cylinder and the keg 106 for pressurising the beverage inside the keg 106.

As schematically indicated in FIG. 2, the housing 102 comprises a storage area access opening 120 for accessing the storage area 104. The storage area access opening 120 is shown closed off by a housing door 122. The storage area access opening 120 is sufficiently wide and high to allow a retail environment employee to place and remove at least one of the keg 106 and the CO2 cylinder 108 as examples respectively of the supply beverage container and the pressurised gas source. By being able to selectively close off the storage area 104, it may be prevented that the consumer gains access to components of the filling arrangement 100 which the consumer does not need for consumer interaction with the filling arrangement 100, for example any of the keg 106, CO2 cylinder, 108, dispensing controller, and/or any other component comprised by embodiments of the filling arrangement 100.

The filling arrangement 100 depicted in FIG. 2 comprises the optional cooling unit 124 for cooling the storage area 104. The housing 102, or at least part thereof, may be insulated to decrease the energy required for cooling the storage area 104 when the temperature inside the storage area 104 is lower than an ambient temperature surrounding the housing 102.

The beverage dispensing unit 110 as depicted in FIG. 2 comprises the growler holder 112 as the retail beverage container holder which holds the growler 113 as the retail beverage container. In this example, the growler 113 comprises a support flange 115 and the growler 113 is suspended at the support flange 115 by the growler holder 112. In other examples, the growler 113 may stand with its bottom on a pedestal comprised by an example of a retail beverage container holder.

As an option depicted in FIG. 2, the consumer interaction module comprises a touch screen 114 for receiving a consumer input and generating a consumer control signal 116 based on the received consumer input.

The filling arrangement 100 further comprises a dispensing controller 118 arranged for receiving the consumer control signal 116 and for controlling the beverage dispensing unit 110 in accordance with the consumer control signal. As such, the dispensing controller 118 may generate and send a dispensing module control signal 119 and the beverage dispensing unit 110 may be arranged to receive the dispensing module control signal 119 and dispense beverage in accordance with the received dispensing module control signal 119.

As depicted in FIG. 2, the beverage dispensing unit 110 may comprise a dispensing unit housing 126 defining a dispensing compartment 128. The growler holder 112 is provided in the dispensing compartment 128, and as such a growler 113 held by the growler holder 112 may be provided in the dispensing compartment 128 as well. The growler holder 112 is arranged to hold the growler 113 in a first orientation indicated with reference numeral 144, which may correspond to an axial direction of the growler 113.

By virtue of the dispensing unit housing 126, the dispensing area 128 as depicted in FIG. 2 is substantially separated from the storage area 104. Hence, it may be prevented that any beverage dispensed into the dispensing area 128 reaches the storage area 104. It will be obvious that preferably all beverage is dispensed into a retail beverage container. However, if some beverage is spilled in the dispensing unit housing 126, a drain 130 is provided as an option. The drain 130 may be provided at the bottom of the dispensing unit housing 126, and the drain 130 may be provided with a reservoir 131 for receiving drained beverage. This reservoir may be easily removable from the filling arrangement 100 to dispose of any spilled beverage.

To prevent a consumer from interacting with a retail beverage container during the filling process, access to the dispensing area 128 may be restricted by the dispensing compartment door 132 for selectively opening or closing off the dispensing compartment.

As an option, applicable when the filling arrangement 100 comprises a dispensing compartment door 132, the filling arrangement 100 may comprise a dispensing compartment door locking mechanism for locking the dispensing compartment door. When locked, the dispensing compartment door cannot be opened by the consumer. The locking mechanism may be an automatic locking system governed by the dispensing controller 118. The dispensing controller 118 may for example be arranged to lock the locking mechanism before starting filling of the retail beverage container, and to unlock the locking mechanism when the filling process has ended such that the consumer can safely open the dispensing compartment door to remove the filled retail beverage container from the retail beverage container holder 112.

As a further option also applicable in other embodiments of the filling arrangement 100, the filling arrangement 100 comprises a beverage level sensor 134. The beverage level sensor 134 may be a part of the beverage dispensing unit 110. The beverage level sensor 134 is arranged to provide a level sensor signal 136 indicative of a beverage level inside the growler 113 as the retail beverage container held by the growler holder 112.

When the filling arrangement 100 comprises a beverage level sensor 134, the dispensing controller 118 may be further arranged for receiving the level sensor signal 136 and for controlling the beverage dispensing unit 110 according to the level sensor signal. For example, when the level sensor signal 136 is indicative of a sufficiently filled retail beverage container, the dispensing controller 118 may control the beverage dispensing unit 110 to stop dispensing beverage.

The beverage level sensor 134 may be embodied as an optical sensor, optionally in combination with a light source, arranged to look through the growler 113, for example through a neck section 115 of the growler 113. In other embodiments, the beverage level sensor 134 may be embodied as an in-line flow sensor, as a weight sensor for measuring the weight of the retail beverage container during filling, or as any other sensor arranged to obtain information indicative of a beverage level inside the retail beverage container during filling. As a further alternative, a timer may be used to specify a specific filling time.

To provide the consumer with a label to paste on a filled retail beverage container, as an option, the filling arrangement 100 depicted in FIG. 2 comprises the label printer 138 which may be accompanied by a label printer controller. The label printer controller may control the label printer based on for example at least part of the consumer control signal.

The dispensing line 150 may be connected to a dispensing line connector 140 of the beverage dispensing unit 110. The dispensing line 150 may be a fixed dispensing line 150 intended for use with a plurality of kegs 106, and may hence comprise a coupler to connected to a keg 106. In other embodiments, the dispensing line 150 may be a disposable dispensing line 150.

Regardless of whether the dispensing line 150 is disposable or not, the dispensing line connector 140 may be arranged to hold or at least orient an outlet end 142 of the dispensing line 150 in a second orientation indicated with reference numeral 146. The second orientation 146 may be at an angle relative to the first orientation 144 at which the growler holder 112 holds the growler 113.

By virtue of the outlet end 142 being oriented at the second orientation 146, beverage may be dispensed under a third orientation 148, which third orientation 148 may be parallel to the second orientation 146. The third orientation 148 is provided at an angle relative to the first orientation 144, and as such the dispensing direction may intersect a side wall of the growler 113. When the third orientation 148 is provided parallel to the first orientation 144, and thus not at an angle relative to the first orientation 144, the dispensing direction intersects the growler 113 at a bottom 121 of the growler 113.

Embodiments of the filling arrangement 100 may be arranged for counter-pressure filling of a retail beverage container. The pressurised gas used for the counter-pressure filling process may originate from the pressurised gas source provided in the storage area 104. As such, a filling pressure gas conduit 154 may be provided between the CO2 cylinder 108 and the beverage dispensing unit 110. As such, the beverage dispensing unit 110 of FIG. 2 is arranged to receive pressurised gas via the filling pressure gas conduit 154.

Figure 3:
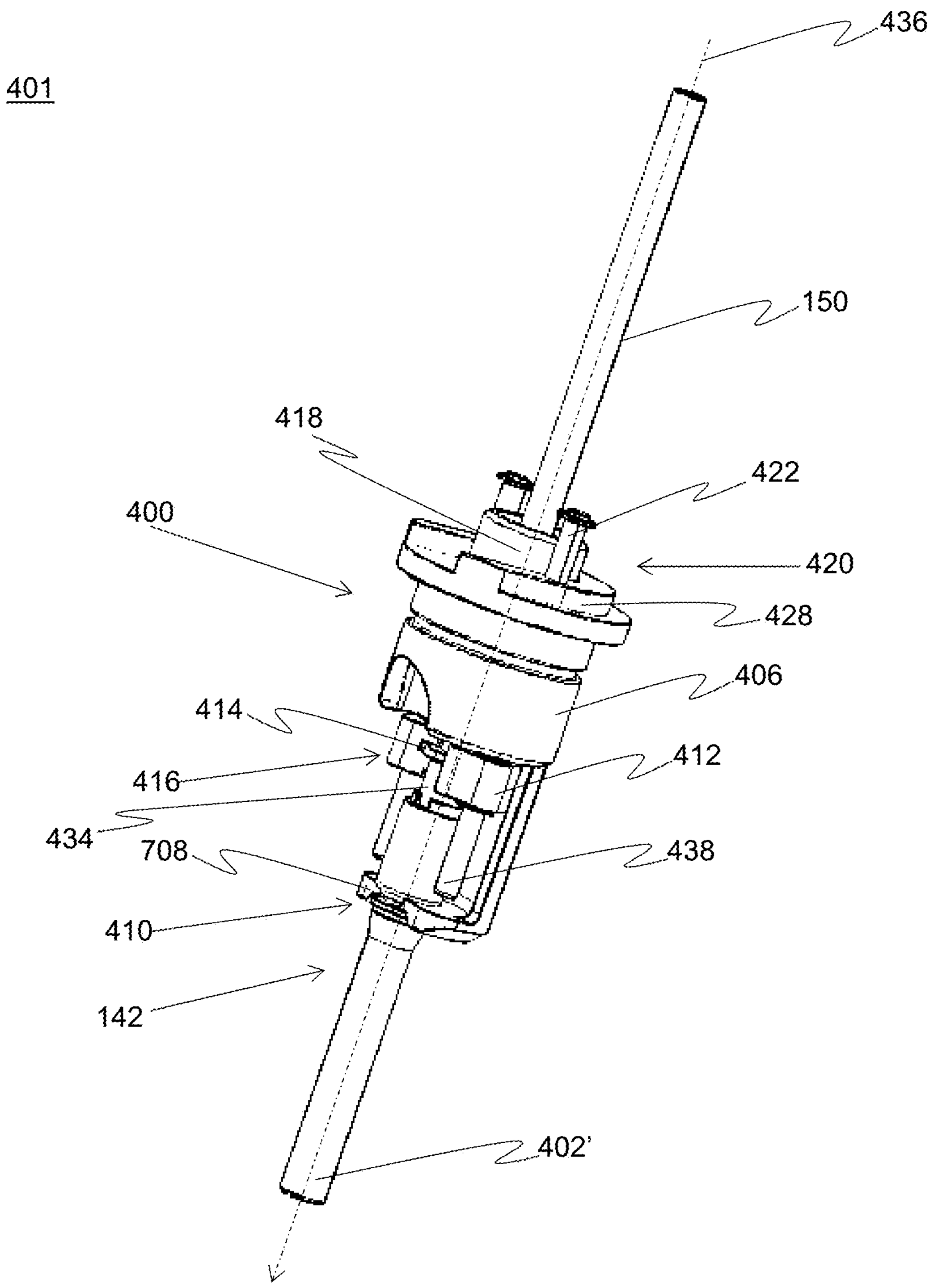
FIG. 3 shows a cartridge assembly for use in a beverage dispensing unit.

FIG. 3 shows a cartridge assembly 401 for use in a beverage dispensing unit. The cartridge assembly 401 comprises a cartridge 400, comprising a cartridge body 406, and an actuable element 412. Coupled to the cartridge 401 and comprised by the cartridge assembly 401 is a disposable dispensing line 150, of which an outlet end 142 with a distal end 402' extends outside of the cartridge 406.

The cartridge body 406 comprises a first groove 708 as a first dispensing line coupling element. The outlet end 142 of the dispensing line 150 comprises at a first position 410 a first complementary groove such that preferably a snap-fit connection can be achieved between the first groove 708 and the first complementary groove.

The actuable element 412 comprises a second groove 414 as a second dispensing line coupling element. The dispensing line 150 comprises a shut-off valve 434 comprising a valve flange at a second location of the disposable dispensing line 150. Preferably, a snap-fit connection can be achieved by connecting the second groove 414 and the valve flange.

Whereas the embodiment shown by FIG. 3 is described with grooves and complementary grooves, other embodiments may be envisaged with recesses, protrusions, holes and pins and other mechanical features that interact and engage to provide operation of the cartridge assembly as discussed below.

The actuable element 412 is movable relative to the cartridge body 406. In the particular embodiment of FIG. 3, the movement direction is substantially parallel to a flow direction 436 for beverage through the beverage line 150. Hence, when the actuable element 412 is moved in a downstream direction, the shut-off valve 434 is moved towards the distal end 402' of the dispensing line 150 relative to the distal end 402' which does not move. With this movement, the shut-off valve 434 is placed in an opened state corresponding to a dispensing state.

To prevent movement of the actuable member 412 relative to the cartridge body 406 beyond a particular threshold, the actuable member 412 as an option comprises a protrusion 438 as a stop arranged to contact the cartridge body 406 after a particular distance moved by the actuable member 412 relative to the cartridge body 406.

The dispensing line 150 extends through a dispensing line through hole 418. When connecting the dispensing line 150 to the cartridge 400, the dispensing line 150 is pushed through this through-hole 418 with the distal end 402' first.

The actuable element 412 as shown in FIG. 3 comprises an extended part 422 extending out of the cartridge body 406 at the upstream end of the cartridge body. This extended part 422 may in embodiments be the part of the actuable element 412 interacting with the actuator module.

Figure 4A:
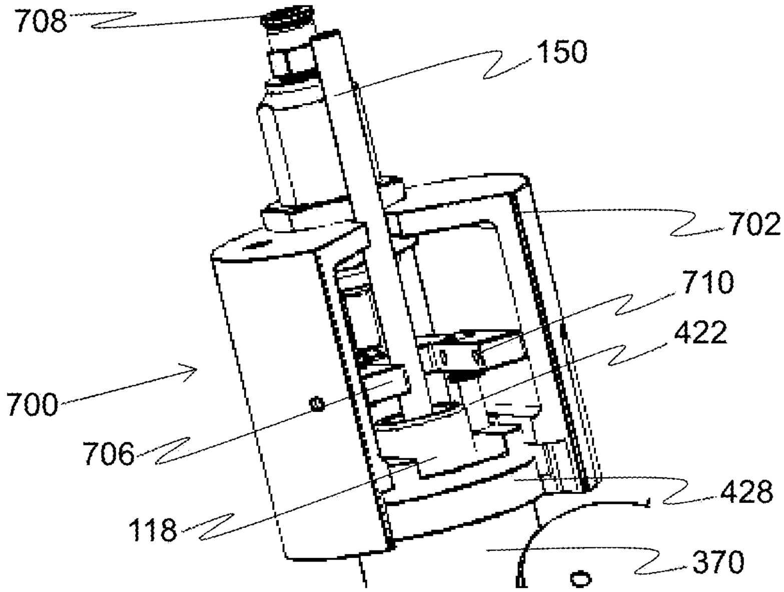
FIG. 4A and FIG. 4B show an embodiment of an assembly of a cartridge assembly 301 and an actuator module.
Figure 4B:
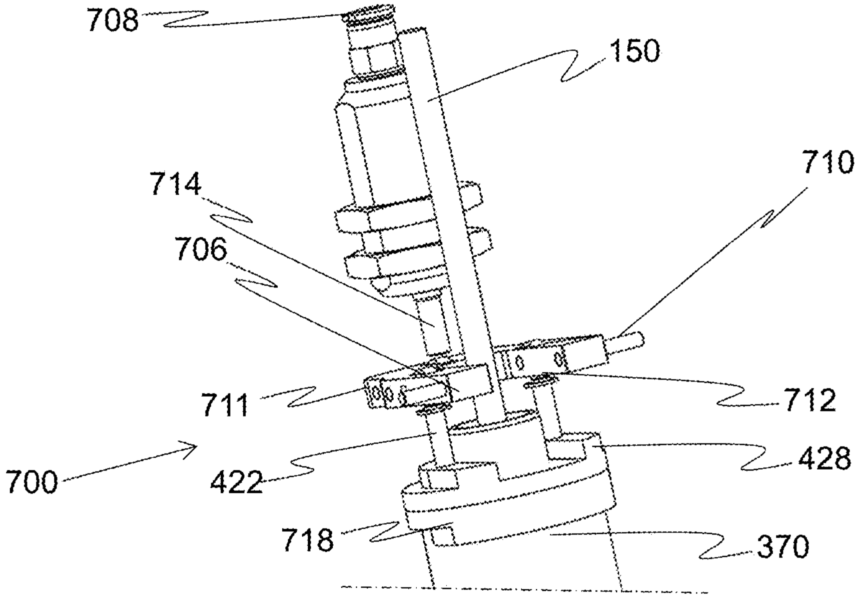

FIG. 4A and FIG. 4B show the same embodiment of an assembly of a cartridge assembly 301 and an actuator module 700. The actuator module 700 comprises an actuator body 702, wherein in FIG. 4B the actuator module housing 702 is omitted to show further components comprised by the actuator module 700.

The actuator module 700 further comprises a pressurised gas inlet 708 comprised by a force input, such that a pressure force from a pressurised gas provided to the pressurised gas inlet 708 can be used as an input force for the actuator module 700. The force input further comprises a piston 714 of which a first side is provided in fluid connection with the pressurised gas inlet 708. The piston 714 is arranged to translate relative to the actuator body 702.

The actuator module 700 also comprises a force transmission module for coupling the force input to a force output. In the particular embodiment shown in FIGS. 4A and 4B, the force transmission module comprises a lever 706. The lever 706 is hingeable around a lever hinge point 710, which lever hinge point 710 is provided by the actuator body 702.

At a first location 711 on the lever 706, which is visible in FIG. 4B, the lever 706 is arranged to engage with a second side of the piston 714, such that the piston 714 can provide a force to the level 706 at the first location 711 of the lever 706.

At a second location 712 on the lever 706, the lever 706 is arranged to exert a force on the actuable element 412, and in particular with the extended part 422 extending out of the cartridge body 406.

In the particular embodiment of FIGS. 4A and 4B, the second location 712 is provided between the lever hinge point 710 and the first location 711. Hence, a downward movement of the first location 711 by virtue of the piston 714 pressing on the first location 711 will also cause a downward movement of the second location 712, which in turn causes a downstream movement of the actuable element 412 and may open the shut-off valve of the dispensing line 150.

By changing at least one of the distance between the first location 711 and the second location 712, and the distance between the second location 712 and the lever hinge point 710, a mechanical advantage may be obtained between the piston 714 and the actuable element 412. By virtue of a mechanical advantage, the input stroke may be larger than the output stroke or vice versa. The effects of transmission of force is proportional to the inverse thereof.

To connect the actuator module 700 to the beverage dispensing unit 110, the actuator housing body 702 may be connected to the receptacle 370. For example, the actuator housing body 702 may be slid over the actuator mount 428 of the cartridge and an actuator mount 718 of the receptacle 370. With this connection, also, movement of the cartridge 400 relative to the receptacle 370 may be restricted and preferably prevented. Such movement may have otherwise been caused by a gas pressure at the downstream side of the cartridge 400 which may push the cartridge 400 out of the receptacle 370.

Figure 5:
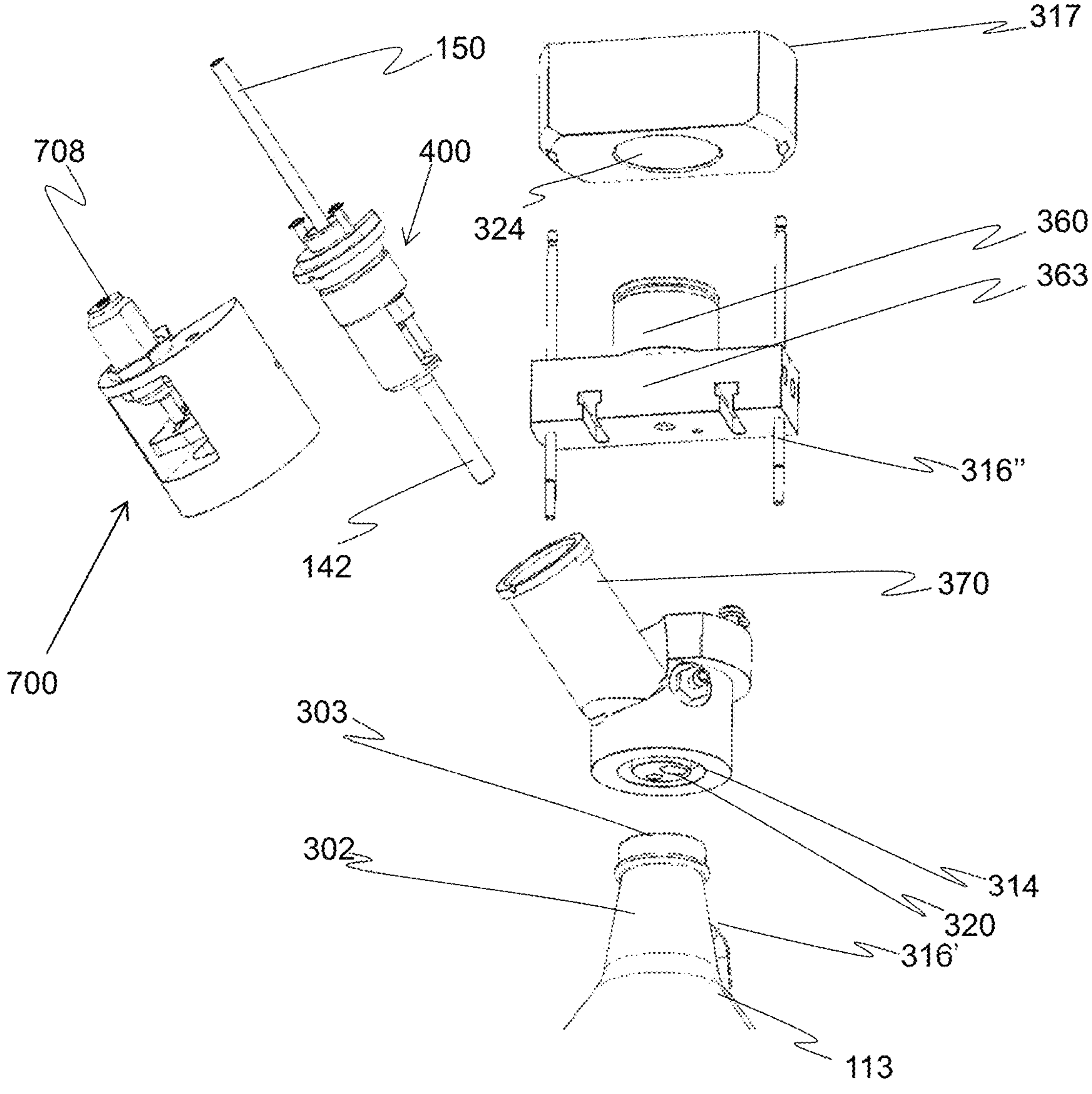
FIG. 5 shows an exploded view of several components comprised by an embodiment of a beverage dispensing unit.

FIG. 5 shows an exploded view of several components comprised by an embodiment of a beverage dispensing unit 110, together with a growler 113 as an example of a beverage container, in particular a retail beverage container. In particular, in the embodiment shown in FIG. 5, which as an option may also be used in conjunction with other embodiments, the sealing mechanism body 316 comprises a lower body part 316' and an upper body part 316".

The lower body part 316' comprises as an option a space 351 for receiving a resilient body (not shown) which may provide the sealing surface 314. The lower body part 316' further comprises as an option a receptacle 370 for receiving a cartridge for holding an outlet end of a disposable dispensing line.

The upper body part 316", with which the lower body part 316' is connectable, comprises the piston 363 with an optional piston ring groove 360 for accommodating a sealing ring. With the sealing ring, which is not shown in FIG. 5, a gas tight seal may be obtained between the piston 363 and the cylinder 324.

A first of the lower body part 316' and the upper body part 316" may comprise one or more slidable connection members 353, and a second of the lower body part 316' and the upper body part 316" may comprise one or more slidable connection receptacles 352. As such, when the slidable connection members 353 are slid into the slidable connection receptacles 352, the lower body part 316' and the upper body part 316" are connected. In particular a movement between the lower body part 316' and the upper body part 316" in a direction perpendicular to the sliding direction is substantially constricted.

Also visible in FIG. 5 is that a downstream end of the dispensing line passage 320 is provided at or near the sealing surface 314.

Figure 6A:
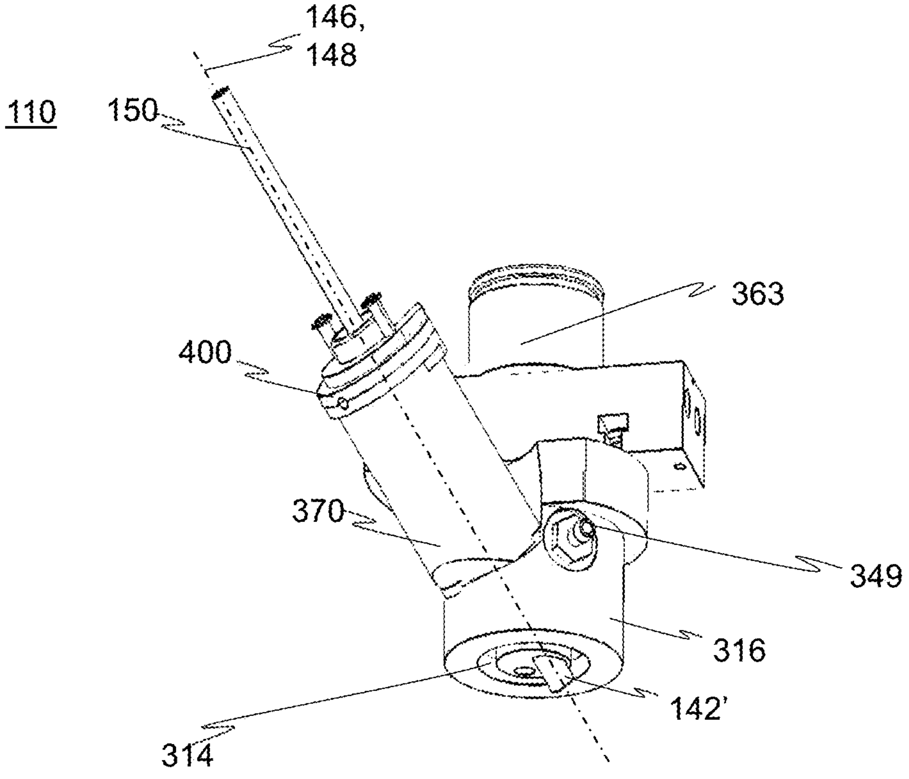
FIG. 6A shows a particular embodiment of a sealing mechanism body.

FIG. 6A shows several components comprised by an embodiment of a beverage dispensing unit 110 together with a growler 113. The beverage dispensing unit 110 comprises a sealing mechanism body 316, comprising a receptacle 370 for receiving a cartridge 400 for holding an outlet end of a disposable dispensing line 150. The receptacle 370 is oriented under a second orientation 146. The dispensing line 150, and in particular an outlet end 142 of the dispensing line 150 is oriented under a third orientation 148. The orientations will be elaborated on in conjunction with FIG. 6B. The receptacle 370 may thus provide the dispensing line passage 320, of which a downstream end is provided at or near the sealing surface 214.

The outlet end 142 of the dispensing line 150 may extend out of the sealing mechanism body 316. In use, the outlet end 142 may, when the sealing surface 314 forms the seal with the growler 113, protrude into the growler 113, and in particular only into the neck portion 306 of the growler 113 and not into the body 308.

Figure 6B:
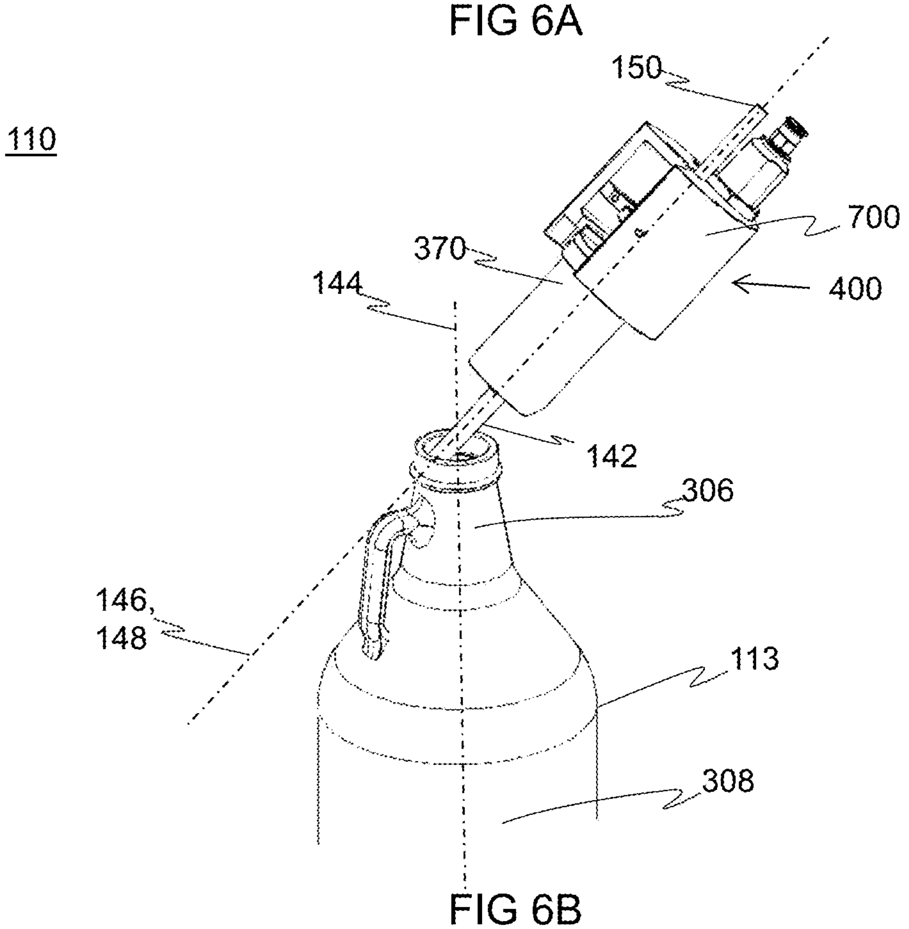
FIG. 6B shows several components comprised by an embodiment of a beverage dispensing unit.

FIG. 6B shows a growler 113 as an example of a retail beverage container, and the cartridge 400 for holding the outlet end 142 of the disposable dispensing line 150. In FIG. 6B, the receptacle 370 and the sealing mechanism body 316 are not shown for clarity of the figure. The growler 113 is oriented under a first orientation 144 by virtue of the beverage container holder 112, also not shown for conciseness of the figure. In use, the first orientation 144 may be substantially parallel to the gravity direction.

The cartridge 400 is placed under a second orientation 146 by virtue of the receptacle 370, and in particular by virtue of the orientation of the receptacle 370 relative to the beverage container holder 112. With the cartridge 400 placed under the second orientation 146, the dispensing line 150 and in particular the outlet end 142 is placed under a third orientation 146 which represents a dispensing orientation. The third orientation 148 may be parallel to the second orientation 146, or may be at an angle relative to the second orientation 146.

As shown in FIG. 6B, by virtue of the dispensing orientation 148 being at an angle relative to the first orientation 144 of the growler 113, beverage can be dispensed against an inner wall of the growler 113, in particular against an inner wall of the neck portion 306 of the growler 113. Such dispensing may decrease foaming of the beverage while the beverage is being dispensed.

The invention claimed is:

1. A cartridge for holding an outlet end of a disposable dispensing line, the cartridge being arranged to be releasably placed in a cartridge receptacle of a beverage dispensing unit , the cartridge comprising:

a cartridge body , arranged to be connected to a beverage container filler, comprising a first dispensing line coupling element arranged to couple with the disposable dispensing line at a first position of the disposable dispensing line;

an actuatable element , comprising a second dispensing line coupling element arranged to couple with the disposable dispensing line at a second position of the disposable dispensing line, wherein the actuatable element is moveable relative to the cartridge body such that the second dispensing line coupling element is moveable relative to the first dispensing line coupling element between an open position and a closed position respectively corresponding to a dispensing state and a closed state of the disposable dispensing line.

2. The cartridge according to claim 1, wherein the cartridge body comprises a dispensing line through-hole arranged for allowing passage of the outlet end of the disposable dispensing line into the cartridge body.

3. The cartridge according to claim 2, wherein the cartridge comprises a through-hole sealing member provided in the dispensing line through-hole arranged to form a gas tight seal with the dispensing line for gas tightly sealing off the dispensing line through-hole.

4. The cartridge according to claim 2 , wherein the dispensing line through-hole is provided at an upstream end of the cartridge body.

5. The cartridge according to claim 1, wherein an extended part of the actuatable element extends out of the cartridge body.

6. The cartridge according to claim 1, wherein the first dispensing line coupling element faces the second dispensing line coupling element, and the first dispensing line coupling element is moveable relative to the second dispensing line coupling element in a direction substantially parallel to a flow direction for beverage through the disposable dispensing line.

7. The cartridge according to claim 1, wherein the first dispensing line coupling element faces the second dispensing line coupling element, and the first dispensing line coupling element is moveable relative to the second dispensing line coupling element in a direction substantially perpendicular to a flow direction for beverage through the disposable dispensing line.

8. The cartridge according to claim 1, further comprising a biasing element for biasing the actuatable element in the closed position.

9. The cartridge according to claim 1, wherein the cartridge body comprises an actuator mount for mounting an actuator module to the cartridge body.

10. A cartridge assembly for use in the beverage dispensing unit, comprising:

the cartridge according to claim 1;

the disposable dispensing line, at a first position coupled with the first dispensing line coupling element and at a second position coupled with the second dispensing line coupling element.

11. The cartridge assembly according to claim 10, wherein a distal end of the outlet end of the disposable dispensing line extends out of the cartridge body.

12. An actuator module for actuating the actuatable element of the cartridge according to claim 1, comprising:

an actuator housing connectable to an actuator mount of the cartridge;

a force input for receiving an input force;

a force output for exerting a force on the actuatable element of the cartridge; and a force transmission module for coupling the force input to the force output.

13. The actuator module according to claim 12, wherein the force input comprise a pressurised gas inlet and the input force is a pressure force from a pressurised gas provided to the pressurised gas inlet.

14. The actuator module according to claim 12, wherein the force transmission module comprises a lever, wherein:

the lever is hingeable around a lever hinge point;

the lever is at a first location arranged to receive a force from the force input;

the lever is at a second location arranged to exert a force on the actuatable element of the cartridge as the force output; and the first location and the second location are at a distance from the lever hinge point.

15. The actuator module according to claim 14, wherein the second location is provided between the lever hinge point and the first location.

16. The beverage dispensing unit for use in a beverage container filling arrangement, comprising:

a beverage dispensing unit housing;

a beverage container holder arranged to receive and hold a beverage container; and a cartridge receptacle for receiving at least part of the cartridge according to claim 1, wherein the cartridge receptacle comprises a through-hole extending towards the beverage container holder.

17. The beverage dispensing unit according to claim 16, wherein the cartridge receptacle comprises an actuator mount for connecting an actuator module, the actuator module comprising:

an actuator housing connectable to an actuator mount of the cartridge;

a force input for receiving an input force;

a force output for exerting a force on the actuatable element of the cartridge; and a force transmission module for coupling the force input to the force output.

18. The beverage dispensing unit according to claim 16, further comprising the cartridge or a cartridge assembly provided in the cartridge receptacle, the cartridge assembly comprising: a cartridge body and an actuator mount for mounting an actuator module to the cartridge body.

19. The beverage dispensing unit according to claim 16, further comprising an actuator module, the actuator module comprising:

an actuator housing connectable to an actuator mount of the cartridge;

a force input for receiving an input force;

a force output for exerting a force on the actuatable element of the cartridge; and a force transmission module for coupling the force input to the force output.

20. The consumer operable beverage container filling arrangement for use in a retail environment, comprising the beverage dispensing unit according to claim 16.

* * * * *